United States Patent

Adam

[11] Patent Number: 4,525,583
[45] Date of Patent: Jun. 25, 1985

[54] QUATERNARY AMMONIUM SUBSTITUTED BENZOTHIAZOLYLPHENYL AZO PYRIMIDINE DYES

[75] Inventor: Jean-Marie Adam, Rosenau, France

[73] Assignee: Ciba-Geigy Corporation, Ardsley, N.Y.

[21] Appl. No.: 457,822

[22] Filed: Jan. 13, 1983

[30] Foreign Application Priority Data

Jan. 19, 1982 [CH] Switzerland ............. 310/82

[51] Int. Cl.³ ............. C09B 29/036; C09B 29/36; C09B 44/08; D06P 1/41
[52] U.S. Cl. ............. 534/606; 106/23; 534/589; 534/596; 534/612; 534/616; 534/775
[58] Field of Search ............. 260/158, 154

[56] References Cited

U.S. PATENT DOCUMENTS

| 3,438,964 | 4/1969 | Dien | 260/158 |
| 3,577,404 | 5/1971 | Entschel et al. | 260/162 |
| 3,609,136 | 9/1971 | Wegmuller et al. | 260/154 |
| 3,933,787 | 1/1976 | Moser | 260/158 |
| 4,071,312 | 1/1978 | Blackwell | 8/7 |
| 4,211,697 | 7/1980 | Desai | 260/158 |

FOREIGN PATENT DOCUMENTS 0034725 2/1981 European Pat. Off. ............. 260/157

Primary Examiner—Floyd D. Higel
Attorney, Agent, or Firm—Wenderoth, Lind & Ponack

[57] ABSTRACT

Benzthiazole compounds of the formula

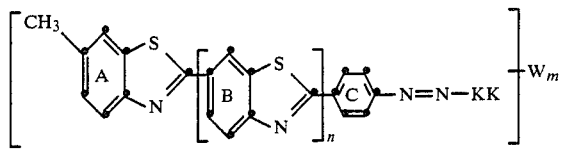

or a tautomeric form thereof, in which KK is the radical of a pyrimidine coupling compound as defined, W is a radical of the formula $-CH_2-NH-CO-C_1-C_4$-alkyl-$Q^\oplus$ $An^\ominus$ in which An is an anion and Q is a quaternary radical of the formula

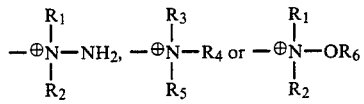

in which $R_1$ to $R_6$ independently of one another are a substituted or unsubstituted $C_1$-$C_4$-alkyl radical, or the radicals $R_1$ and $R_2$, or $R_3$ and $R_4$, or $R_3$ and $R_4$ and $R_5$, together with the N atom, form a heterocyclic ring, m is the number 1, 2 or 3 and n is the number 0 or 1, and in which the benzene radicals A, B and/or C may be further substituted are particularly suitable as dyes for paper, brilliant yellow to orange dyeings which have, in particular, good wet-fastness and light-fastness, being obtained.

9 Claims, No Drawings

QUATERNARY AMMONIUM SUBSTITUTED BENZOTHIAZOLYLPHENYL AZO PYRIMIDINE DYES

The invention relates to novel benzthiazole compounds of the formula I

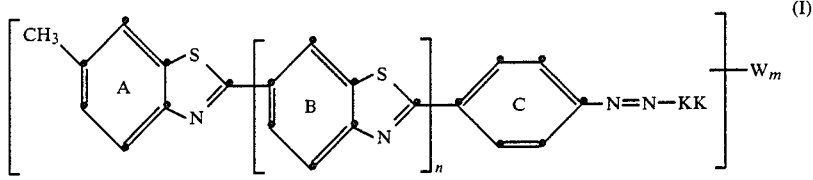

and their tautomeric forms, in which KK is the radical of a pyrimidine coupling component of the formula

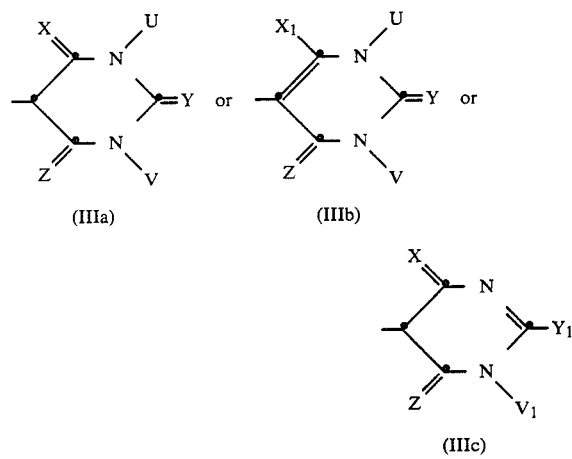

in which X and Z independently of one another are O or NH, Y is the group O, NH, S or N—CN, U and V independently of one another are hydrogen, a substituted or unsubstituted $C_1$-$C_4$-alkyl group or a substituted or unsubstituted phenyl group, or one of the radicals U or V is CN and the other is hydrogen, $X_1$ is $C_1$-$C_4$-alkyl, $Y_1$ is hydrogen, an NH—$C_1$-$C_4$-alkyl group, an NH-phenyl group, an N-($C_1$-$C_4$-alkyl)$_2$ group, a phenyl group or a $C_1$-$C_4$-alkyl group and $V_1$ is hydrogen, a substituted or unsubstituted $C_1$-$C_4$-alkyl) group or a substituted or unsubstituted phenyl group, W is a radical of the formula —$C_2$—NH—CO—$C_1$-$C_4$-alkyl-Q⊕An⊖ in which An is an anion and Q is a quaternary radical of the formulae

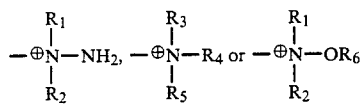

in which $R_1$ to $R_6$ independently of one another are a substituted or unsubstituted $C_1$-$C_4$-alkyl radical, or the radicals $R_1$ and $R_2$, or $R_3$ and $R_4$, or $R_3$ and $R_4$ and $R_5$, together with the N atom, form a heterocyclic ring, m is the number 1, 2 or 3 and n is the number 0 or 1, and in which the benzene radicals A, B and/or C may be further substituted.

If the benzene radicals A, B and/or C are further substituted, particularly suitable substituents are $C_1$-$C_4$-alkyl groups.

Examples of substituted phenyl groups U, V and $V_1$ are $C_1$-$C_4$-alkyl groups, halogen, such as fluorine, chlorine or bromine, and $C_1$-$C_4$-alkoxy groups, for example the methoxy, ethoxy, n-propoxy, isopropoxy and tert.-butoxy group.

A particularly suitable substituent on a substituted $C_1$-$C_4$-alkyl group $R_1$ to $R_6$ or U, V or $V_1$ is the OH group.

A heterocyclic ring formed by $R_1$ and $R_2$ and/or $R_3$ and $R_4$, including the N atom, is, for example, the morpholine, pyrrolidine, piperidine or piperazine ring.

A heterocyclic ring $R_3$ and $R_4$, together with $R_5$, including the N atom, is, for example, a pyridinium ring, which may be substituted (for example by $C_1$-$C_4$-alkyl), or a triethylenediamine ring of the formula

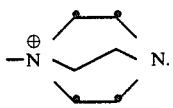

The substituent W can be bonded directly to the benzene radicals A, B and/or C, or indirectly via a substituent, for example a phenyl group in the substituents U, V, $V_1$ or $Y_1$.

In this context and in the text which follows, the expression "$C_1$-$C_4$-alkyl" means a straight-chain or branched alkyl radical having 1 to 4 carbon atoms, for example the methyl, ethyl, n-propyl, iso-propyl, n-butyl, or tert.-butyl radical.

In the preferred benzthiazole compounds of the formula I, the benzene radicals A, B and C are not further substituted other than by the substituent W; n is the number 0 and m is the number 1; KK is as defined in formula IIIa, in which the substituents X, Y and Z are each oxygen or X and Z are each oxygen and Y is the NH group; U and V independently of one another are hydrogen, $CH_3$ or chlorophenyl, or one of the radicals U or V is CN and the other is hydrogen, and W is the grouping

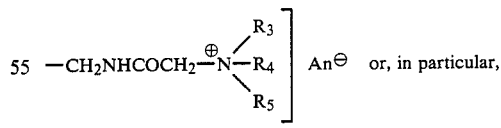

the grouping 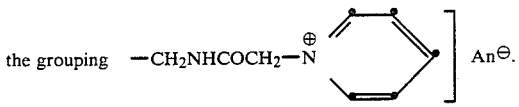

4 in

The anions "An" can be either inorganic or organic anions, and examples are halide, such as chloride, bromide or iodide, sulfate, methylsulfate, tetrafluoborate, aminosulfonate, perchlorate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate anions, or complex anions, such as that of zinc chloride double salts.

Examples of a quaternary amine radical Q of the type defined are:

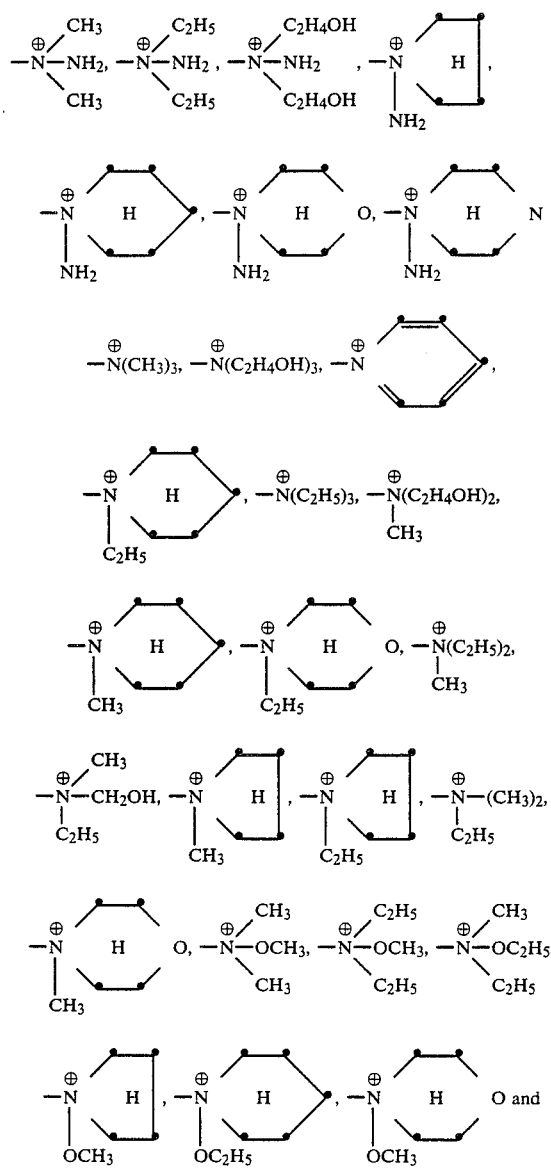

The tautomeric form of the pyrimidine coupling component KK in the benzthiazole compounds can have the following configurations, to mention only a few from the large number of configurations:

(a) the tautomeric form of the formula IIIa:

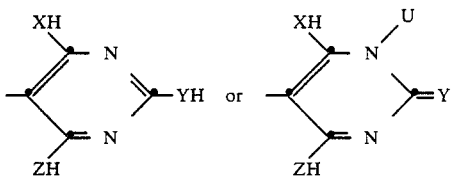

(b) the tautomeric form of the formula IIIb:

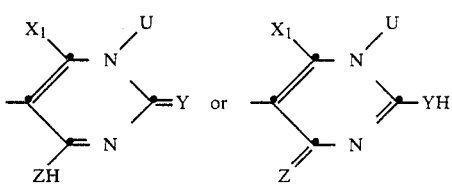

and (c) the tautomeric form of the formula IIIc:

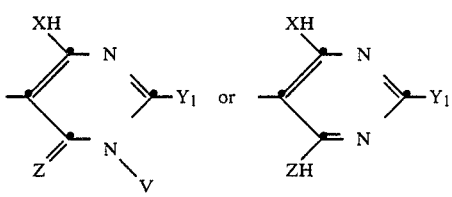

The benzthiazole compounds of the formula I are prepared in a manner which is known, for example by a process which comprises diazotising an amine of the formula II

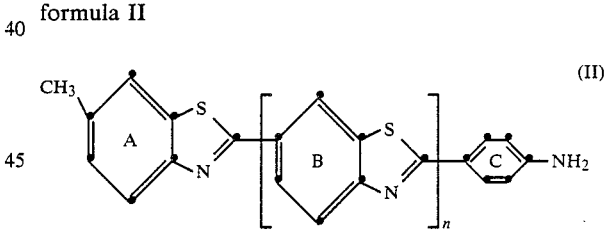

and coupling the diazotisation product with a coupling component of the formula III

H—KK     (III)

to give an intermediate of the formula IV

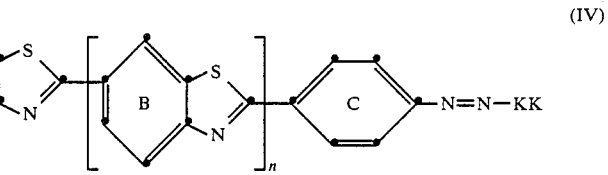

After the coupling reaction, the group —CH$_2$NH-CO—$_{C_1}$-C$_4$-alkyl-Hal is introduced into this intermediate of the formula IV, and the product is then reacted with a tertiary amine. In the formulae II, III and IV, the symbols A, B, C, KK and n are as defined under formula I and Hal in the —CH$_2$NHCO—C$_1$-C$_4$-alkyl-Hal group is a halogen atom.

The starting compounds of the formulae II and III and the intermediates of the formula IV are known, or they can be prepared by known methods; the diazotisation and coupling reactions are likewise known.

The group —CH$_2$NHCO—C$_1$-C$_4$-alkyl-Hal is introduced into the intermediate of the formula IV by means of the Einhorn reaction (Angew. Chem. 69, 463 (1957)), using, in particular, the corresponding methylolamide. The reaction is carried out in the presence of concentrated sulfuric acid (for example monohydroate) or phosphoric acid, if necessary together with phosphorus pentoxide, at a temperature from about 0° to 50° C., preferably at room temperature.

After this —CH$_2$NHCO—C$_1$-C$_4$-alkyl-Hal group has been introduced into the intermediate of the formula IV, the product is reacted with a tertiary amine (corresponding to the radical Q), such as trimethylamine or pyridine, the benzthiazole compounds of the formula I being obtained.

The novel benzthiazole compounds of the formula I are used, in particular, as dyes for dyeing and printing textiles, paper and leather and for the preparation of inks.

Suitable textiles for which these dyes can be used to dye or print are wool, silk and acid-modified polyamide materials, as well as polyacrylonitrile materials, especially wet tow, and modified polyester material which can be dyed under basic conditions. Natural and regenerated cellulose materials are also suitable, especially cotton and viscose, brilliant yellow to orange dyeings being obtained in some cases. On these textiles, especially on the cellulose materials mentioned, the dyes of the formula I according to the invention have a good affinity, a good degree of exhaustion and a good build-up, and the resulting dyeings have good fastness properties, especially good wet-fastness and light-fastness.

The dyes of the formula I according to the invention, especially those with a tetrafluoborate anion, can also be used for spin dyeing polyacrylonitrile materials.

The dyes of the formula I according to the invention are preferably used for dyeing all types of paper, especially bleached and sized lignin-free paper. They are particularly suitable for dyeing unsized paper (tissues), as a result of their very high standard affinity for this substrate.

The dyes according to the invention are absorbed very well onto these substrates, and the effluent remains colourless, even in the production of deep shades (up to above 1/1 SD=standard depth shade), which is an important technical and ecological advantage, especially in view of the present effluent laws. The good degree of exhaustion is also of advantage for good reproducibility of the shade, and is virtually unaffected by the hardness of the water. The dyeings are wet-fast, i.e. they show no tendency to bleed when wet coloured paper is brought into contact with moist white paper. This property is particularly desirable for so-called "tissues", for which it can be predicted that the wet coloured paper (for example impregnated with water, alcohol, surfactant solution and the like) comes into contact with other surfaces, such as textiles, paper and the like, which must be protected from soiling.

The high affinity for paper and the high rate of exhaustion of the dyes according to the invention, coupled with the very good build-up, is of great advantage for the continuous dyeing of paper, and thus permits very broad application of this known and very economical process, which has the following advantages:

(a) simpler and more rapid correction of the shade and thus less loss of paper which does not conform to type (waste);

(b) better constancy of shade; (no "tailing") and (c) thorough cleaning of the mixing vat after each batch is unnecessary, while at the same time the operation is shortened and the process is optimised.

The yellow to orange dyeings are brilliant and have very good fastnesses, especially light-fastness.

The dyes of the formula I are also used for dyeing leather materials by the most diverse methods of application, such as spraying, brushing and immersion, and for the preparation of all types of inks, such as for ball-point pens and printing inks.

The examples which follow illustrate the invention without in any way restricting the scope thereof. Temperatures are in degrees Centigrade and parts (p) and percentages are by weight.

The abbreviation RKN is a quality term and indicates the degree of purity of the cellulose; the abbreviation SR=Schopper-Riegler indicates the freeness.

EXAMPLE 1

24 parts of 2-(4'-aminophenyl)-6-methylbenzthiazole are diazotised in a known manner. The suspension of the diazo compound is then introduced into a mixture of 13 parts of barbituric acid and 22 parts of sodium carbonate in water. When the coupling has ended, the compound of the formula

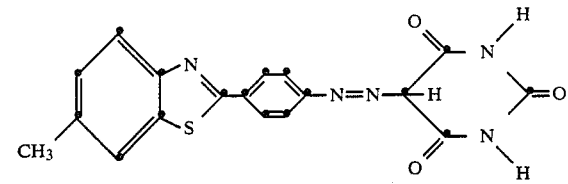

is filtered off with suction and dried.

10 parts of the resulting compound and 4 parts of N-methylolchloroacetamide are introduced into 100 parts of monohydrate at 0° to 5°, and the mixture is stirred at room temperature until the starting material is no longer present in the thin layer chromatogram. The reaction mixture is poured onto ice, whereupon the product precipitates; the product is then filtered off and washed neutral with water. After drying, 12 parts of the compound:

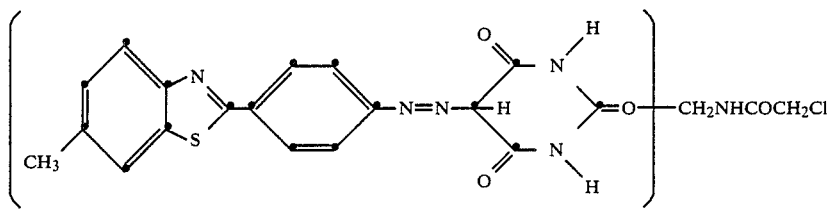

are obtained.

10 parts of this compound are warmed to 100° in 100 parts of pyridine for 1 hour. The benzthiazole compound of the formula

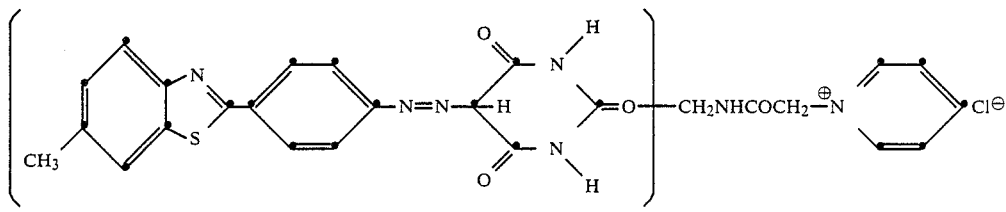

which has precipitated is isolated by filtration and dried. It is very readily soluble in water and dyes paper in brilliant yellow shades with very good fastness properties (in particular light-fastness), and displays excellent build-up.

EXAMPLE 2

The procedure described in Example 1 is repeated, except that the 24 parts of 2-(4-aminophenyl)-6-methyl-benzthiazole are replaced by 37 parts of primulin base. The benzthiazole compound of the formula

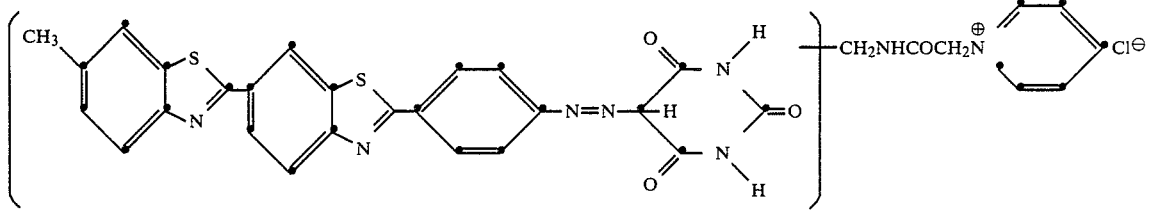

which dyes paper in orange shades, is obtained.

EXAMPLES 3–17

The procedure described in Example 1 is repeated, except that the equivalent amount of the pyrimidine compounds shown in the following Table 1, column 2, are used instead of 13 parts of barbituric acid. The benzthiazole compounds of the formula

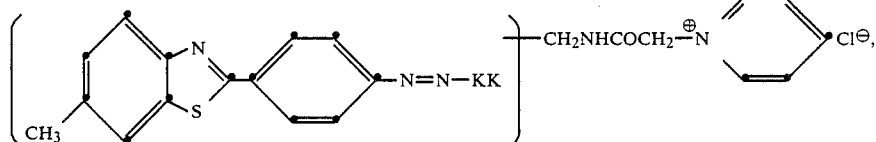

in which the radical KK corresponds to the pyrimdine compound given in column 2 and is in each case bonded to the azo bridge in the 5-position, are obtained. The shade produced by the benzthiazole compounds on paper is given in column 3.

TABLE 1

| Example No. | Pyrimidine compound | Shade on paper |
|---|---|---|
| 3 | 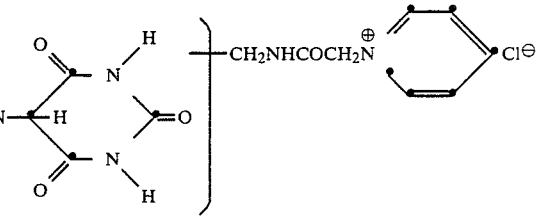 | yellow |
| 4 | 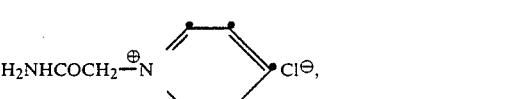 | yellow |

TABLE 1-continued

| Example No. | Pyrimidine compound | Shade on paper |
|---|---|---|
| 5 | (structure: barbituric acid derivative with =CH-CH3) | yellow |
| 6 | (structure with CH3, =O) | yellow |
| 7 | (structure with =S) | yellow |
| 8 | (structure with =CH-phenyl) | yellow |
| 9 | (structure with N-C2H5, =S, N-C2H5) | yellow |
| 10 | (structure with NH, =H, HN) | yellow |
| 11 | (structure with NH, =S, NH) | yellow |
| 12 | (structure with NH, =NH, O) | yellow |
| 13 | (structure with CH3, =NH, O) | yellow |
| 14 | (structure with HN, =S, O) | yellow |
| 15 | (structure with NH, N-CH3, =O, N-CH3) | yellow |
| 16 | (structure with NH, =O) | yellow |
| 17 | (structure with =NH, O) | yellow |
| 18 | (structure with HN, =NH, HN) | yellow |

EXAMPLE 19

50 parts of chemically bleached beech sulfite are mixed with 50 parts of bleached sulfite RKN 15 (20° SR freeness) and 2 parts of the benzthiazole compound according to Example 1 in water (pH 6, water of 10° German hardness, temperature 20°, liquor ratio 1:4). After the mixture has been stirred for 15 minutes, sheets of paper are produced on a Frank sheet-forming machine. The paper is coloured in a very intense, brilliant, light-fast yellow shade. The degree of exhaustion reaches 100% and the effluent is colourless.

EXAMPLE 20

The procedure described in Example 19 is repeated, except that 2 parts of the known acid dye of the formula

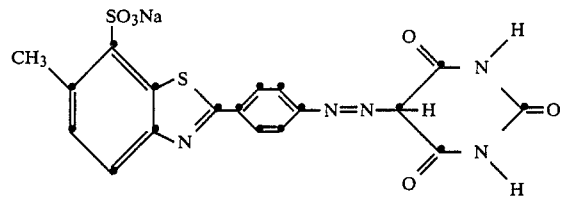

(U.S. Pat. No. 4,071,312) Example 1 are used. The paper is coloured a yellow shade. The degree of exhaustion scarcely reaches 60% and the effluent is coloured deep yellow.

I claim:

1. A benzthiazole compound of the formula

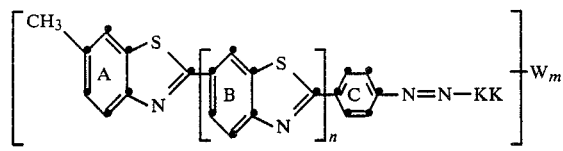

in which KK is the radical of a pyrimidine coupling component of the formula

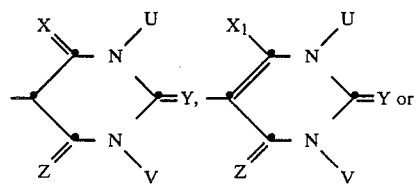

in which X and Z independently of one another are O or NH, Y is the group O, NH, S or N—CN, U and V independently of one another are hydrogen, $C_1$–$C_4$-alkyl which is unsubstituted or substituted by hydroxy or phenyl which is unsubstituted or substituted by $C_1$–$C_4$ alkyl, halogen or $C_1$–$C_4$ alkoxy, or one of the radicals U or V is CN and the other is hydrogen, $X_1$ is $C_1$–$C_4$-alkyl, $Y_1$ is hydrogen, NH—$C_1$–$C_4$-alkyl, NH-phenyl, N—($C_1$–$C_4$-alkyl)$_2$, phenyl or $C_1$–$C_4$-alkyl and $V_1$ is hydrogen, $C_1$–$C_4$-alkyl which is unsubstituted or substituted by hydroxy or phenyl which is unsubstituted or substituted by $C_1$–$C_4$ alkyl, halogen or $C_1$–$C_4$alkoxy, W is a radical of the formula —$CH_2$—NH—CO—$C_1$–$C_4$-alkyl-Q$^\oplus$An$^\ominus$ in which An is an anion and Q is a quaternary radical of the formula

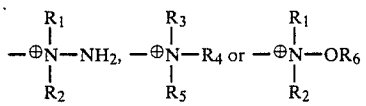

in which $R_1$ to $R_6$ independently of one another are $C_1$–$C_4$-alkyl which is unsubstituted or substituted by hydroxy, or the radicals $R_1$ and $R_2$, or $R_3$ and $R_4$ together with the N atom to which they are attached form a heterocyclic ring selected from morpholine, pyrrolidine, piperidine or piperazine, or $R_3$ and $R_4$ and $R_5$, together with the N atom to which they are attached, form a heterocyclic ring selected from pyridinium which is unsubstituted or substituted by $C_1$–$C_4$ alkyl or

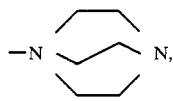

m is the number 1, 2 or 3 and n is the number 0 or 1, and in which the benzene radicals A, B and C independently are unsubstituted or are substituted by $C_1$–$C_4$ alkyl.

2. A benzthiazole compound according to claim 1 wherein the benzene radials A, B and C are not further substituted except, where relevant, by the substitutent W.

3. A benzthiazole compound according to claim 1 wherein n is 0.

4. A benzthiazole compound according to claim 1 wherein m is 1.

5. A benzthiazole compound according to claim 1 wherein KK is

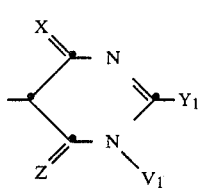

in which X, Y and Z are each 0.

6. A benzthiazole compound according to claim 1 wherein KK is

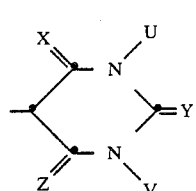

in which X and Z are each 0 and Y is NH.

7. A benzthiazole compound according to claim 1 wherein KK is

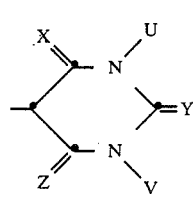

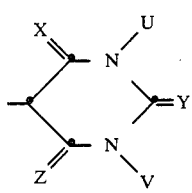
in which U and V independently of one another are hydrogen, CH₃ or chlorophenyl or in which one of the radicals U and V is hydrogen and the other is CN.
8. A benzthiazole compound according to claim 1 wherein W is
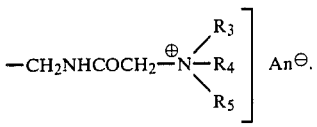
9. A benzthiazole compound according to claim 1 wherein W is
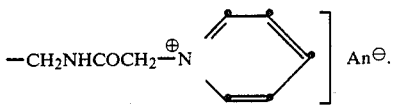
* * * * *